Aug. 17, 1965 J. J. AMODEI 3,201,613

ELECTRICAL CIRCUIT

Filed March 8, 1961

INVENTOR.
JUAN J. AMODEI
BY Samuel Cohen

1

3,201,613

ELECTRICAL CIRCUIT

Juan J. Amodei, Levittown, Pa., assignor to Radio Corporation of America, a corporation of Delaware
Filed Mar. 8, 1961, Ser. No. 94,366
12 Claims. (Cl. 307—88.5)

The present invention relates to a circuit for enhancing the high speed performance of a transistor. While not restricted thereto, the circuit has special application in switching circuits for digital computers.

Transistors have found wide use in switching circuits. They require relatively little power, are of small size, and can provide on-off operation at sharply defined output voltage levels. One such level may correspond to no conduction through the transistor (cut-off) and the other to saturation. Saturation may be defined as the state of the transistor in which its collector junction, which is normally reversed biased, becomes forward biased. The reverse bias across the collector junction provides the field which sweeps the minority carriers arriving from the emitter into the collector. Accordingly, when this junction becomes forward biased, transistor action, that is, gain, is lost.

Any increase in base current beyond that required to saturate a transistor produces no increase in collector current and no appreciable change in collector voltage. Accordingly, any input signal of an amplitude equal to or greater than that required to produce saturation, results in a transistor output signal which is "clamped" to a standard voltage level.

The phenomenon just described is advantageous in that it provides automatic standardization of signal levels at each stage of a digital circuit. Additional clamps such as diodes are not required. However, this advantage is obtained at the expense of high speed operation. When the input signal becomes larger than that required to saturate the transistor, carrier storage effects introduce delays in circuit operation. If "overdrive" is defined as that portion of the input current or voltage beyond the level required to saturate the transistor, it is found that as the overdrive is increased, the number of charge carriers stored increases correspondingly. The storage of charge carriers manifests itself as a delay between the abrupt removal of the input signal producing saturation and the time the collector voltage starts to change to conform to the new input conditions. This delay is known as "storage time." This delay as well as the "turn-on time" and "turn-off time" (the durations of the leading and lagging edges, respectively, of a transistor output pulse) are parameters which affect the speed at which a transistorized circuit is capable of operating.

As overdrive is increased, the transistor turn-on time is decreased. This is advantageous as it tends to speed up transistor operation. However, the increase in the overdrive increases the storage time as already discussed and also decreases the number of circuits which could otherwise be driven by the stage producing the overdrive signal. In computer terms, the requirement for increased overdrive limits the "fan-out" possible from the stage producing the overdrive signal. Thus, speed is obtained at the expense of logical gain.

Transistor circuits are known which overcome the storage effects discussed above. They employ a circuit associated with the transistor for preventing the transistor from saturating. These transistor circuits, however, rely on the preceding stages to furnish the additional power (the overdrive) required for fast operation. Therefore, they do not overcome the "fan-out" problem discussed above.

Moreover, to obtain reasonable turn-off times from an overdriven transistor stage it may be necessary quiescently to reverse bias the transistor to a value well below cut-off rather than to bias the transistor close to its threshold of conduction. This reverse bias implies that the input overdrive voltage must charge the input capacitance of the transistor through a larger voltage increment than would be necessary if the transistor were biased closer to its threshold. This further reduces the logical gain of the circuit. Moreover, the charging of the capacitance requires time and this results in an increase in the "turn-on delay" (the delay between the start of an input signal and the start of the output signal) thereby counteracting, to some extent, the increase in transistor turn-on speed obtained by the use of the large overdrive voltage.

2

An object of the present invention is to improve the high speed performance of a transistor.

Another object of the present invention is to provide a high speed switching circuit which is especially useful in digital computers.

Another object of the present invention is to provide a transistor-amplifier suitable for amplifying short duration pulses and which provides output pulses having very steep leading and lagging edges.

Another object of the present invention is to provide a transistor circuit of the common emitter configuration (emitter connected to ground) which is quiescently biased in the forward direction at a point slightly below that required to produce conduction through the transistor so that an input pulse of small amplitude can turn the transistor "on."

The circuit of the invention includes a transistor-amplifier and a circuit associated with the amplifier which responds to a small input pulse for overdriving the transistor. The circuit associated with the amplifier then reduces the current flowing through the transistor to a value such that the transistor is only lightly in saturation or is even somewhat below saturation immediately after the start of the input pulse and within the input pulse interval. The same circuit sharply reduces the input current to the transistor in response to the lagging edge of the input pulse thereby speeding up the fall time of the lagging edge of the transistor output pulse.

A specific form of the invention includes a transistor in common emitter circuit configuration and a negative resistance diode of the voltage controlled type such as a tunnel diode connected in shunt across the emitter-to-base electrodes of the transistor. The tunnel diode responds to a small input signal and generates locally a large overdrive signal of short duration (one less than the input pulse interval) which does not derive its power from the driving stages. By making the overdrive of short duration and independent of the signal being applied, high turn-on speed is achieved without increasing storage time and without decreasing fan-out.

In addition, the circuit of the invention provides, when in its "off" state, an output voltage clamped at a given level, and an input current threshold which can be the basis for performing logical operations. Diode gates at the input are not required.

The invention is described in greater detail below and is illustrated in the following drawing of which:

Figure 1:
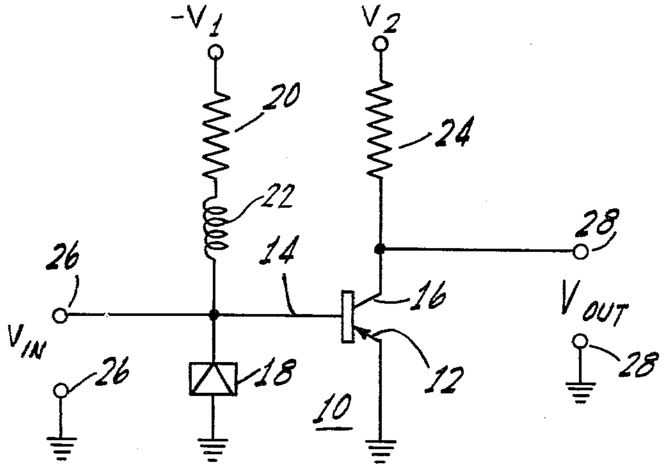
FIG. 1 is a schematic circuit diagram of a circuit embodying the invention.

The circuit of FIG. 1 includes a transistor 10 having emitter 12, base 14, and collector 16 electrodes. A tunnel diode 18 is connected in shunt across the base 14 to the emitter 12 diode of the transistor. The tunnel diode is quiescently biased by a voltage source $-V_1$ which is connected through resistor 20 and inductor 22 to the cathode of the tunnel diode. Operating voltage is supplied to the collector 16 from source $-V_2$ through resistor 24. The input $V_{in}$ to the transistor is applied to terminals 26 and the output from the transistor is taken from terminals 28.

Figure 2:
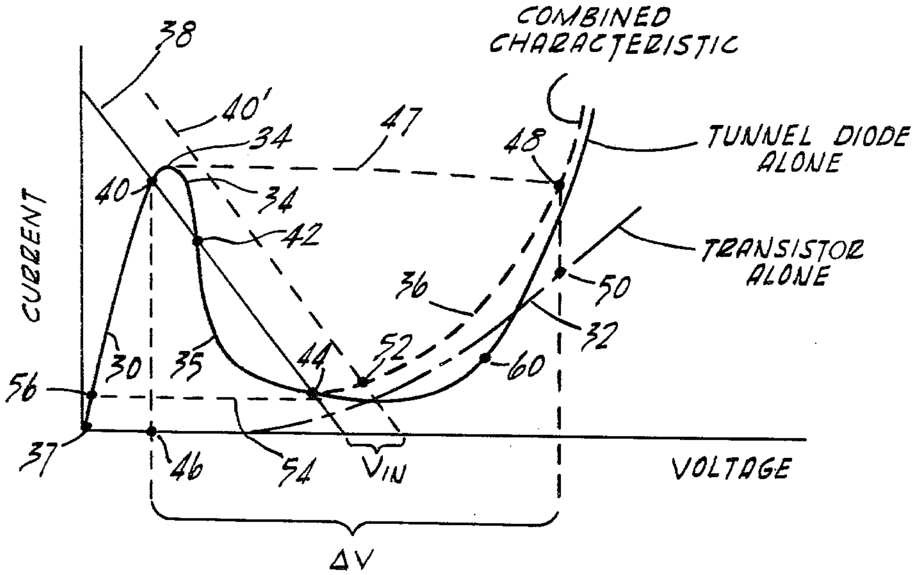
FIG. 2 shows static characteristic curves of current versus voltage for certain of the circuit elements in FIG. 1.

The operation of the circuit of FIG. 1 may be better understood by referring to FIG. 2. Solid line 30 is a characteristic curve of current versus voltage for the tunnel diode 18 alone. Dot-dash curve 32 is the characteristic curve of current versus voltage for the transistor looking into the base 14 toward ground. The composite characteristic for these circuit elements is shown at 37, 34, 35, 36.

The load line for source $-V_1$ and the resistor 20 and inductor 22 in series is shown by solid line 38. This is a load line for monostable operation of the circuit. The load line intersects the low voltage positive resistance region of the tunnel diode curve at operating point 40 and intersects the negative resistance operating region of the tunnel diode curve at points 42 and 44. As intersection 40 is the only stable intersection between the tunnel diode and the load line, the circuit operating point is initially at 40.

The tunnel diode is in shunt across the emitter-to-base diode of the transistor. At operating point 40 the voltage applied to the base of the transistor (about 50 to 80 millivolts or so for the case in which the tunnel diode 18 is a gallium arsenide tunnel diode) is insufficient to cause conduction through the transistor. Note in this connection that at operating point 46 (FIG. 2) the current flowing into the base of the transistor is substantially zero milliamperes.

When an input pulse $V_{in}$ is supplied to terminals 26, the effect is to switch the operating point from 40 along a line such as dashed line 47 to 48. The operating point goes to 48 initially as the current flowing through the inductor 22 cannot change instantaneously and remains at substantially its former value (the value at operating point 40). (It might be well to mention here that the impedance of the transistor looking into the base, during switching, is somewhat lower than that indicated by the static charcteristic of FIG. 2. Accordingly, the portion 52–48 of the composite charcteristic is in a somewhat lower voltage range and operating point 48 is somewhat to the left—at a lower voltage value, than shown in FIG. 2. However, for purposes of the present discussion, the simplified showing of FIG. 2 is adequate.) At operating point 48 the current flowing into the base (the current available at operating point 50) is of sufficient amplitude to drive the transistor into heavy saturation. Note that only a very small input signal is required to produce this large flow of current into the base. In terms of voltages a small input voltage $V_{in}$ (FIG. 2) causes a substantially larger voltage increment $\Delta V$ instantaneously to occur at the base 14.

After a time dependent on the $L/R$ time constant of inductor 22 and the resistances associated with the inductor, the current through the inductor decreases. The decrease in current corresponds to a shift in the circuit operating point from 48 to 52, the intersection of the composite circuit characteristic and the shifted load line 40′. At operating point 52, the current flowing into the tunnel diode is relatively low. The current flowing into the base of the transistor is much lower than its former value but is still sufficient to maintain the transistor either lightly in saturation or slightly out of saturation. Note in this connection that the transistor has substantial gain and a relatively small amount of current flow into the base can correspond to a relatively large collector current.

When the input pulse is removed, the circuit operating point switches from 52 along a line such as dashed line 54 to 56. The decrease in input voltage is such as to switch the tunnel diode back to its low voltage state. The current flowing through the inductor remains approximately at its former value (the current level at 52), however, now substantially all of this current steers into the tunnel diode rather than into the base of the transistor. The result is that the transistor is cut-off very quickly.

After a time again dependent on the $L/R$ time constant of inductor 22 and its associated circuit elements, the current through the inductor begins to increase again. This increase in current flows into the tunnel diode rather than into the transistor in view of the low voltage across the emitter-to-base diode of the transistor. This increase in current corresponds to a shift in the operating point from 56 back to 40—the quiescent operating point of the circuit.

A circuit designed for monostable operation has been built and a transistor turn-on time of about 1 nanosecond (1 nanosecond $=10^{-9}$ seconds) and fall time of about 3½ nanoseconds achieved. A type 2N769 transistor was employed in the circuit. As contrasted to prior art circuits in which very large input pulses are required, the full transistor current gain can be realized since the input signal amplitude is not employed for overdrive purposes but merely to switch the tunnel diode to its high state. Input pulse durations can be employed of 5 nanoseconds or less. The circuit design is such that the $L/R$ time constant associated with inductor 22 is less than the duration of the narrowest pulse to be handled by the circuit. Time constants of 1 to 5 nanoseconds have been found to give good high speed performance for pulses of different durations. Other factors affecting the speed of circuit response are the characteristics of the tunnel diode and of the transistor; in order to speed up transistor switching it is required that the tunnel diode be "faster" than the transistor. To this end, it was found that a gallium arsenide diode of 50 milliamperes peak current gave somewhat improved performance over a slower gallium arsenide tunnel diode of 5 milliamperes peak current.

A typical circuit according to FIG. 1 designed for monostable operation may have the following circuit parameters:

| | |
|---|---|
| Resistor **20** | 56 ohms. |
| Resistor **24** | 1,000 ohms. |
| Inductor **22** | .33 microhenries. |
| Transistor **10** | Type 2N501 or 2N769. |
| Tunnel diode **18** | Gallium arsenide. |
| Voltage $-V_1$ | .04 volt. |
| Voltage $-V_2$ | 7.5 volts. |

To check the performance of the circuit of FIG. 1 it was compared with a similar circuit without the tunnel diode 18. With the circuit of FIG. 1 employing a 1,000 ohm coupling resistor (not shown) between the input terminal 26 and the common tunnel diode cathode-transistor base connection, it was found that a 2.5 volt pulse at terminal 26 produced a rise time of about two nanoseconds. To obtain the same rise time without the tunnel diode and with the same coupling resistor, it was necessary to use a 25 volt input pulse at terminal 26. The storage time with a pulse of this amplitude was found to be 10 nanoseconds and the fall time of the output pulse was about 20 nanoseconds. As already mentioned, with the tunnel diode in the circuit, a fall time of about 3½ nanoseconds was observed and there was no appreciable storage time.

It is possible to reduce the fall time at the expense of some increase in rise time in the circuit of FIG. 1 by slightly reverse biasing the emitter of the transistor. For example, the emitter may be biased to the extent of $-.1$ volt.

It is also possible to improve the fall time of the circuit tested without the tunnel diode. However, this requires a reverse bias voltage to be applied to the base of the transistor. This reverse bias results in turn-on delay—a delay between the time of application of the input pulse and the start of the output pulse, as well as additional loss of gain. The latter occurs as part of the input signal must be used to overcome the reverse bias.

As already mentioned, it is possible to use a gallium arsenide or other type of tunnel diode for the element 18. A gallium arsenide tunnel diode gives somewhat better performance than a germanium diode, for example, in view of the larger valley voltage of the gallium arsenide tunnel diode. A silicon tunnel diode is also quite suitable as its valley voltage is between that of the germanium and gallium arsenide tunnel diode.

The circuit of FIG. 1 can be operated bistably rather than monostably. When so operated, the load line should be such that it quiescently intersects the low voltage positive resistance region of the diode at an operating point such as 40 and the high voltage operating region of the diode at an operating point at a current level somewhat greater than the valley voltage of the tunnel diode. For example, the load line may intersect the characteristic at points such as 40 and 60. This type of load line can readily be achieved by increasing the value of resistance 20. When so operated, a positive polarity reset pulse at terminal 26 may be used to reset the tunnel diode.

In summary, the circuit described provides high speed operation which is suitable, for example, for performing logic at speeds of 100 megacycles without sacrificing transistor gain for speed purposes. Saturation time is reduced considerably by virtue of the fact that the transistor turn-on overdrive is transient and also turn-off overdrive is provided. The low base clamping voltage together with the high turn-on overdrive also help to decrease the turn-on delay. When operated monostably, the circuit may be used with conventional diode gates or it can use tunnel diode current threshold devices for performing logic functions without requiring reset pulses or clock pulses and without sacrificing rise time or recovery time. When operating monostably, the $L/R$ time constant associated with inductor 22 can readily be decreased by reducing the value of the inductor.

What is claimed is:

1. In combination, a transistor; means for applying an operating voltage to the transistor; and means connected to the base of the transistor and responsive to an input pulse of relatively low amplitude for first applying to the base of the transistor a signal of substantially larger amplitude than said input pulse and of sufficient magnitude to produce relatively heavy conduction through the transistor, then, still during the input pulse interval, reducing the amplitude of said signal applied to the base of the transistor to a substantially lower value but still sufficient to support substantial conduction of current through the transistor, and, when the input pulse terminates, sharply reducing the amplitude of the signal applied to said base of said transistor to a value well beneath that required to support conduction through the transistor.

2. In combination, a transistor; means for applying an operating voltage to the transistor; and means connected to the base of the transistor and responsive to an input pulse of relatively low amplitude for first applying to the base of the transistor a signal of substantially larger amplitude than said input pulse and of sufficient magnitude to produce heavy conduction through the transistor, then, still during the input pulse interval, reducing the amplitude of said signal applied to the base of the transistor to a substantially lower value still sufficient to support substantial conduction of current through the transistor but not greater than that corresponding to light saturation of the transistor, and, when the input pulse terminates, sharply reducing the amplitude of the signal applied to said base of said transistor to a value well beneath that required to support conduction through the transistor.

3. In combination, a transistor; means for applying an operating voltage to the transistor; and means connected to the base of the transistor and responsive to an input pulse of relatively low amplitude for first applying to the base of the transistor a signal of substantially larger amplitude than said input pulse and of sufficient magnitude to produce saturation in the transistor, then, still during the input pulse interval, reducing the amplitude of said signal applied to the base of the transistor to a substantially lower value corresponding to light saturation of the transistor, and, when the input pulse terminates, sharply reducing the amplitude of the signal applied to said base of said transistor to a value well beneath that required to support conduction through the transistor.

4. In combination, a transistor; means for applying an operating voltage to the transistor; means for quiescently forward biasing the base of the transistor at a level lower than that required to support conduction through the transistor; and means including a tunnel diode connected to the base of the transistor and responsive to an input pulse of relatively small amplitude for first applying to the base of the transistor a signal of substantially larger amplitude than said input pulse and of sufficient magnitude to produce saturation in the transistor, then, still during the input pulse interval, reducing the amplitude of said signal applied to the base of the transistor to a substantially smaller value corresponding to light saturation of the transistor, and, when the input pulse terminates, sharply reducing the amplitude of the signal applied to said base of said transistor to a value smaller than said quiescent bias level and well beneath that required to support conduction through the transistor.

5. In combination, a transistor having emitter, base, and collector electrodes and connected in common emitter circuit configuration; means for applying an operating voltage to the transistor; means connected to the base of the transistor for quiescently forward biasing the base to a voltage lower than that which will support substantial conduction through the transistor; and means responsive to an input pulse of insufficient amplitude to overdrive the transistor for first applying to the base of the transistor a signal at a current and voltage level sufficient to overdrive the transistor into saturation, then, still within the input pulse interval, reducing the current level of the signal applied to the base of the transistor to a value corresponding to light saturation of the transistor.

6. In combination, a transistor having emitter, base, and collector electrodes and connected in common emitter circuit configuration; means for applying an operating voltage to the transistor; means connected to the base of the transistor for quiescently forward biasing the base to a voltage lower than that which will support substantial conduction through the transistor; and means responsive to an input pulse of insufficient amplitude to overdrive the transistor for first applying to the base of the transistor a signal at a current and voltage level sufficient to overdrive the transistor into saturation, then, still within the input pulse interval, reducing the current level of the signal applied to the base of the transistor to a value corresponding to light saturation of the transistor, and, when the input pulse terminates, sharply reducing the voltage level at the base of the transistor to a value lower than said forward bias voltage to enhance the turn-off speed of the transistor.

7. In combination, a transistor having emitter, base, and collector electrodes and connected in common emitter circuit configuration; means for applying an operating voltage to the transistor; means including an inductor and resistor in series connected to the base of the transistor for quiescently forward biasing the base to a voltage lower than that which will support substantial conduction through the transistor; and means including a tunnel diode connected in shunt with the emitter-to-base diode of the transistor responsive to an input pulse of insufficient amplitude to overdrive the transistor for first applying to the base of the transistor a signal at a current and voltage level sufficient to overdrive the transistor into saturation, then, still within the pulse interval, reducing the current level of the signal applied to the base of the transistor to a value corresponding to light saturation of the transistor, and, which when the pulse terminates, sharply reducing the voltage level at the base of the transistor to a value lower than said forward bias voltage to enhance the turn-off speed of the transistor.

8. In combination, a transistor having emitter, base, and collector electrodes; a negative resistance diode of the voltage controlled type connected across the emitter-to-base diode of the transistor; means for applying an operating voltage to the collector of the transistor; and means for quiescently biasing the negative resistance diode to the high current region of its low voltage positive resistance operating region, said means including an inductor and resistor in series and providing a load line which intersects the current versus voltage characteristic of the negative resistance diode in the negative resistance region but which does not intersect the current versus voltage characteristic of the diode in its high voltage positive resistance operating region.

9. In combination, a transistor having emitter, base, and collector electrodes; a tunnel diode connected across the emitter-to-base diode of the transistor; means for applying an operating voltage to the collector of the transistor; and means for quiescently biasing the tunnel diode to the high current region of its low voltage positive resistance operating region, said means including an inductor and resistor in series and providing a load line which intersects the current versus voltage characteristic of the tunnel diode in the negative resistance region but which does not intersect the current versus voltage characteristic of the diode in its high voltage positive resistance operating region.

10. In combination, a transistor having an emitter-to-base diode; and means including a voltage controlled negative resistance diode connected in shunt, like element to like element, with the emitter-to-base diode of said transistor, and responsive to an input pulse of relatively low amplitude for first applying to the base of the transistor a signal of substantially larger amplitude than said input pulse and of sufficient magnitude to produce relatively heavy conduction through the transistor, then, still during the input pulse interval, reducing the amplitude of said signal applied to the base of the transistor to a substantially lower value but still sufficient to support substantial conduction of current through the transistor, and, when the input pulse terminates, sharply reducing the amplitude of the signal applied to said base of said transistor to a value well beneath that required to support conduction through the transistor.

11. In combination, a transistor; means for applying an operating voltage to the transistor; and means including an active element and an inductor connected to the transistor and responsive to an input pulse of relatively low amplitude for first applying to the base of the transistor a signal of substantially larger amplitude than said input pulse and of sufficient magnitude to produce relatively heavy conduction through the transistor, then, still during the input pulse interval, reducing the amplitude of said signal applied to the base of the transistor to a substantially lower value but still sufficient to support substantial conduction of current through the transistor, and, when the input pulse terminates, sharply reducing the amplitude of the signal applied to said base of said transistor to a value well beneath that required to support conduction through the transistor.

12. In combination, a transistor having emitter, base, and collector electrodes; means for applying an operating voltage to one of said electrodes; and means including an inductor and active element in series connected to the base electrode of the transistor and responsive to an input pulse of relatively low amplitude for first applying to the base of the transistor a signal of substantially larger amplitude than said input pulse and of sufficient magnitude to produce heavy conduction through the transistor, then, still during the input pulse interval, reducing the amplitude of said signal applied to the base of the transistor to a substantially lower value still sufficient to support substantial conduction of current through the transistor but insufficient appreciably to forward bias said collector electrode, and, when the input pulse terminates, sharply reducing the amplitude of the signal applied to said base of said transistor to a value well beneath that required to support conduction through the transistor.

References Cited by the Examiner

UNITED STATES PATENTS 3,129,354 4/64 Hellstrom ---------- 307—88.5 X

OTHER REFERENCES

"Tunnel Diode Logic Circuits," by W. F. Chow, Electronics, June 24, 1960, pages 103 to 107.

"The Tunnel Diode-Circuits and Applications," by I. A. Lesk, N. Holonyak, and U. S. Davidson, Electronics, Nov. 28, 1959, pages 60 to 64.

"Tunnel Diodes as Amplifiers and Switches," by T. P. Sylvan and Erich Gottlieb, Electronic Equipment Engineering, May 1960.

"Tunnel Diode Applications," by Carl Todd, Advanced Applications Section, Hughes Semiconductor Division, Application Engineering Notes, Hughes Semiconductor Division, Newport Beach, Calif., May 1960.

JOHN W. HUCKERT, *Primary Examiner.*

HERMAN KARL SAALBACH, *Examiner.*